Figure 1:
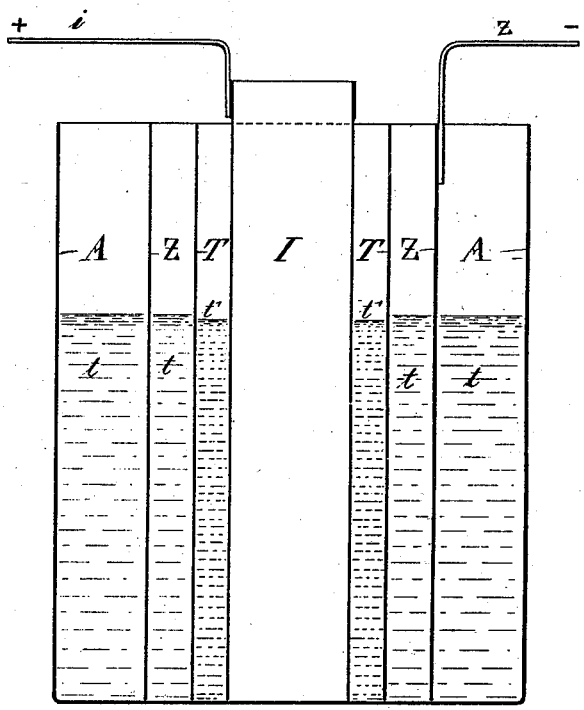

(No Model.)

S. KALISCHER.
SECONDARY BATTERY.

No. 311,008. Patented Jan. 20, 1885.

Witnesses
J. A. Rutherford
Robert Everett

Inventor
Salomon Kalischer
By James L. Norris
Atty

United States Patent Office.

SALOMON KALISCHER, OF BERLIN, GERMANY.

SECONDARY BATTERY.

SPECIFICATION forming part of Letters Patent No. 311,008, dated January 20, 1885.

Application filed May 17, 1884. (No model.)

*To all whom it may concern:*

Be it known that I, SALOMON KALISCHER, of the city of Berlin, in the Kingdom of Prussia, and German Empire, have invented certain new and useful Improvements in Secondary Batteries, of which the following is a specification.

This invention relates to an improved electric accumulator, secondary battery, or storage-battery; and the object of my invention is to produce at a comparatively low cost a secondary battery or electric accumulator whose elements are relatively light as compared with the elements hitherto used in storage-batteries, and thus facilitate the transportation of such batteries, while at the same time I obtain by my improved battery a current of great power and constancy.

My invention consists in the employment, for the anode, of iron, of any convenient form or nature, in combination with a solution of suitable salts of lead, the latter being subjected to the process of electrolysis to produce a dense and solid coating of peroxide of lead upon the iron. Said coating on being metallically connected with a cathode of lead in the liquid remaining after the process of electrolysis will constitute a secondary battery of high electro-motive power, from which a constant current of long duration is obtained.

The principles upon which my invention is based differ entirely from those generally adopted in preparing secondary batteries, inasmuch as in the said batteries as heretofore employed lead, or a combination of lead—such as red lead or sulphuret of lead—were used for the anode, and the latter was changed or transformed into peroxide of lead by means of dilute sulphuric acid or some suitable sulphate—such as sulphate of zinc—subjected to the action of the galvanic current. Now, according to the principles of my present invention, the peroxide of lead is precipitated upon the anode by means of electrolysis and by means of secondary action, respectively, while the iron which, as above stated, is employed for the anode remains unchanged, while metallic lead, released from the solution by the same electrolytic action, is carried to and deposited upon the cathode.

With the secondary batteries as heretofore prepared the elements are soon destroyed by reason of the local action of the current, causing a chemical reaction to take place between the peroxide of lead and the lead; but such injurious action does not take place with the iron anodes of my improved battery, the iron remaining uninjured also during the discharge of the battery, since the peroxide coating produced upon the iron by precipitation is in every respect dense and solid and adheres firmly to the iron, completely inclosing the same. It is due to this adhesive property of the precipitate that the iron may be provided with a coating of peroxide of lead of any desired thickness, depending on the quantity and concentration of the solution of the salts of lead employed and on the length of time during which the galvanic current is passed through the said solution. The anode as well as the cathode may, therefore, be of small volume, and the elements constituting my improved secondary battery will thus have far less weight than those hitherto used in secondary batteries.

The principles of my invention are based upon the well-established fact according to which iron will readily assume, and, under proper conditions, maintain, what is termed in the art the "passive" state, and therefore among all the base metals iron alone will enable me to accomplish the new and useful results hereinbefore referred to.

In preparing the secondary elements forming my improved secondary or storage battery I proceed as follows—that is to say: Iron of any desired nature—such as cast-iron, wrought-iron, malleable iron, or steel—and of any desirable and convenient shape—for example, in the form of plates or cylinders, either in an active or passive state—is placed in a bath consisting of a solution of nitrate of lead, or acetate of lead, or other suitable salt of lead, and subjected to the action of the galvanic current, lead being preferably employed for the cathode. Under the action of the said current, peroxide of lead, either in a pure or hydrated state, is formed upon the anode in the shape of a dense and solid layer or coating of a jet-black, a shining silky black, or a velvety black color, adhering firmly to the iron and completely inclosing the same on all sides, while, at the cathode, metallic lead is separated from the solution and precipitated upon the said cathode. This deposition of the peroxide of lead is not the result of a primary action, but of a secondary set of actions and reactions. This will be seen more clearly from a *résumé* thereof. Supposing the fluid used as an electrolyte be that of a lead salt—for instance, nitrate of lead or $PbN_2O_6$,—the current decomposes part of this into $Pb+O+N_2O_5$—that is, into lead, oxygen, and anhydrous nitric acid. This free lead is immediately carried over and deposited upon the cathode. Simultaneously at the anode $N_2O_5$ unites with water to form $H_2N_2O_6$, which is $2(HNO_3)$ or two volumes of nitric acid, while the liberated oxygen meets undecomposed nitrate of lead, or $PbN_2O_6$, which equals $PbO+N_2O_5$, and the oxygen unites with the PbO, forming $PbO_2$, or peroxide of lead, which is deposited upon the anode. The $N_2O_5$, thus liberated, unites with water, forming $H_2N_2O_6$, or $2(HNO_3)$ two volumes of nitric acid. The series of reactions is carried on so long as the current flows or there is undecomposed nitrate of lead for it to act on. The current being cut off, and the anode and cathode connected, the reverse actions and reactions take place, causing a current to circulate in such circuit. It will be readily understood that I can coat the said iron anode with a solid layer of peroxide of lead of any desired and convenient thickness, depending on the quantity and concentration of the solution of the salt of lead used for the bath and on the length of time during which the said solution is subjected to the action of the galvanic current. After the charge is completed the two electrodes are metallically connected, and will then produce a current which is constant, and whose duration will be dependent only on the thickness of the coating of peroxide of lead produced upon the iron anode during the charging operation. In discharging the elements, the peroxide of lead on the anode is reduced to protoxide of lead, while the metallic lead on the other electrode is oxidized and dissolved in the acid solution. The discharge being finished, the elements may at once be charged again by means of a galvanic current, and thus the operations of charging and discharging the battery may be repeated over and over again in continuous succession without thereby corroding or otherwise injuring the iron used for the anode.

Figure 2:
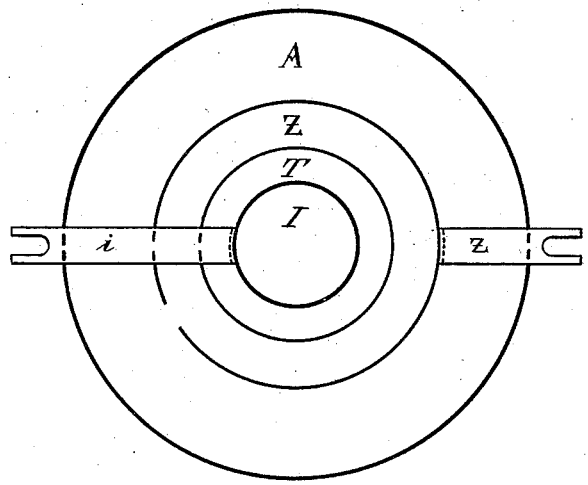

In the accompanying drawings, forming part of this specification, Figure 1 is a vertical section, and Fig. 2 a top view, of an element which will serve to illustrate my invention.

A is a glass receptacle; Z, a slotted cylinder of lead; T, a clay cell; I, a cylinder of iron; $z$, a conductor connecting the cylinder Z with the negative pole of a suitable galvanic battery; $i$, a conductor connecting the iron cylinder I with the positive pole of a battery, and $t\ t'$ are solutions of salts of lead kept apart by the interposed clay cell T, so that there will be no communication between the cylinders Z and I.

The operation is as hereinbefore described—that is to say, under the action of the galvanic currents from the said galvanic battery peroxide of lead is formed upon the anode or positive electrode I, while at the cathode or negative electrode Z metallic lead is separated from the solution and precipitated upon the said electrode Z.

I wish it to be distinctly understood that the form or shape as well as the general construction and arrangement of the elements which I may employ are entirely immaterial for the purposes of my invention, which consists in employing for the anode iron of any suitable form, and forming thereon a layer of peroxide of lead obtained by means of electrolysis from a solution of suitable salts of lead. I may employ an element of the shape of a Daniell element, or of a Bunsen element, or of any other element, and, therefore, I wish it to be distinctly understood that I do in no wise confine myself to the construction and arrangement of the element shown in the drawings.

I am aware that it is not new in secondary batteries to make the frames for holding the active material of iron covered with tin or lead, and having apertures in which such active material is placed. Such provision, however, of iron frames is resorted to solely for obtaining strength and lightness in the battery, and the iron is not acted upon by the exciting-fluid as proposed by me.

Having thus described my invention, what I claim as new, and desire to secure by Letters Patent, is—

In a secondary battery, the combination of a positive electrode made entirely of iron, a negative electrode of lead, and an electrolyte or exciting solution of lead salts, whereby when the battery is charged a peroxide-of-lead coating is produced upon the positive electrode, and metallic lead is deposited upon the negative electrode, substantially as described.

In testimony whereof I have signed my name to this specification in the presence of two subscribing witnesses.

SALOMON KALISCHER.

Witnesses:
 B. ROI,
 G. H. SMITH.